Figure 1:
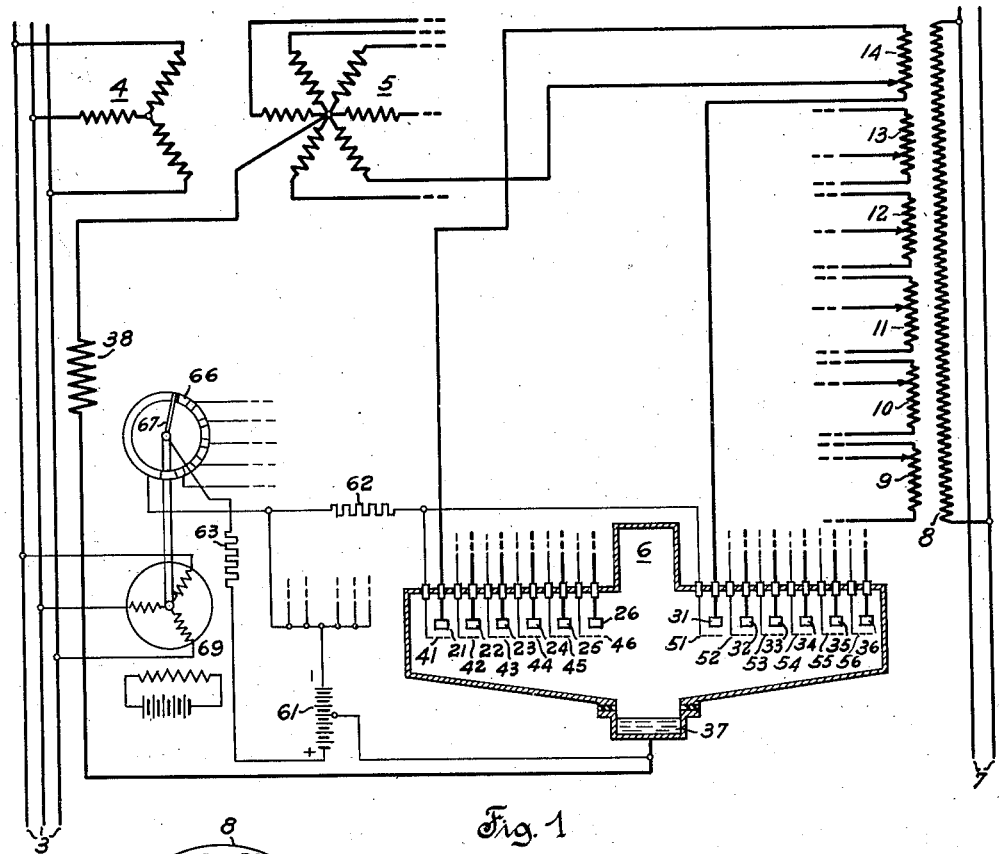

Nov. 7, 1933.   J. JONAS   1,934,230

ARCING FREQUENCY CHANGING SYSTEM

Filed June 16, 1932

ORDER OF ENERGIZATION OF THE
ANODES AND POTENTIAL RELA-
TIONS OF SUPPLY AND DISTRIBU-
TION LINE.

IMPROVED RELATIONS OF
POTENTIALS IN SUPPLY AND
DISTRIBUTION LINE.

Inventor
J. Jonas
by
Attorney

Patented Nov. 7, 1933

1,934,230

UNITED STATES PATENT OFFICE 1,934,230

ARCING FREQUENCY CHANGING SYSTEM

Julius Jonas, Baden, Switzerland, assignor to Aktiengesellschaft Brown Boveri & Cie., Baden, Switzerland, a joint-stock company of Switzerland Application June 16, 1932, Serial No. 617,501, and in Germany June 22, 1931

5 Claims. (Cl. 172—281)

This invention relates to improvements in systems for converting alternating current of one frequency into alternating current of another frequency by the use of an electric current valve of the metallic vapor arcing type.

Prior systems of the character above indicated required a plurality of secondary windings in the transformer which connected the several valves with the supply line from the source, for the purpose of permitting interconnection of the cathode of one valve with the secondary winding neutral point of the transformer connecting the anodes of a second valve with the supply line. A so-called numeral eight or letter B circuit was thus obtained. Such a construction may, however, permit the occurrence of disturbances in operation of the system and particularly increases the cost of the system by increasing the cost of the transformer forming the connection with the supply line.

It is, therefore, among the objects of the present invention to provide a system for converting alternating current of one frequency into alternating current of another frequency in which a transformer with only a single secondary winding connects the electric valve with the supply line.

Another object of the present invention is to provide a system for converting alternating current of one frequency into alternating current of another frequency in which only a single valve is used and is supplied through a transformer having only a single secondary winding.

Another object of the present invention is to provide a system for converting alternating current of one frequency into alternating current of another frequency in which a transformer having a single secondary winding is connected with the supply line, a transformer is connected with the distribution line and the two transformers cooperate to connect the electric valve between the supply and the distribution lines.

Another object of the present invention is to provide a system for converting alternating current of one frequency into alternating current of another frequency in which a transformer having a single secondary winding is connected with the supply line, a transformer is connected with the distribution line and the two transformers cooperate to connect the electric valve between the supply and the distribution lines, the connections between the transformers being such as to vary the potential impressed on the several anodes thus obtaining an approximate sine curve potential in the distribution line.

Figure 2:
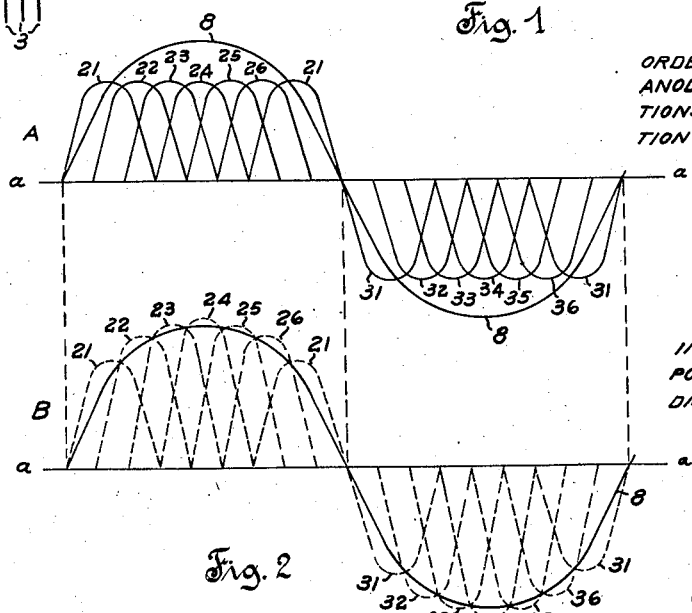

Objects and advantages other than those above set forth will be apparent from the following description when read in connection with the accompanying drawing in which:

Fig. 1 diagrammatically illustrates one embodiment of the invention in which an electric valve of the metallic vapor arcing type is connected between a supply line and a distribution line by means of transformers, the control electrodes of the valve being controlled to permit converting of the frequency of the supply line into a different frequency for delivery to the distribution line; and Fig. 2 shows curves illustrating the relations of the potentials taken from the supply line by the anodes of the electric valve to the potential delivered to the distribution line.

Referring more particularly to the drawing by characters of reference, the reference numeral 3 designates a polyphase electric transmission line supplied from a suitable source (not shown) at any predetermined frequency. A transformer comprising a primary winding 4 and a star connected secondary winding 5 is connected with the line 3 for the purpose of supplying electric current to an electric valve 6 of the metallic vapor arcing type such as is well known in the electric current rectifying art. A single phase electric current distribution line 7 is also connected with the valve 6 through a transformer comprising a secondary winding 8 and a primary winding divided into a plurality of sections 9, 10, 11, 12, 13 and 14, thus forming a delivery or output circuit for the valve which circuit is to be supplied with current at a frequency other than that of the supply line 3. The valve 4 is provided with a plurality of anodes divided substantially into a group numbered from 21 to 26 inclusive and a group numbered from 31 to 36 inclusive. The valve is also provided with a cathode 37 of vaporizable material such as mercury and with the usual means known to the electric current rectifying art for striking and maintaining an arc within the valve, such usual means being, therefore, not shown. The cathode is connected through a reactance 38 with the neutral point of the transformer secondary winding 4 for the purpose of smoothing out the ripples in the current delivered by the valve. The reactance damps current surges occurring when the arc passes from one group of anodes to the other, particularly when the distribution line has an inductive load thereon.

An anode of each group is connected with the terminals of each of the secondary winding portions of the output transformer and one of the phase sections of the supply transformer secondary winding 4 is connected with an intermediate point of each of the output transformer primary winding portions. Thus anodes 21 and 31 are connected with transformer primary winding portion 14, transformer primary winding portion 9 is connected with anodes 26 and 36 and all of the other primary winding portions 10, 11, 12 and 13 are similarly connected with an anode of each group. It will be seen that the points at which the phases of the transformer secondary winding 4 are severally connected with the primary winding portions 8 to 14 inclusive vary, thus producing a variable potential on the anodes of the valve as will be shown. The several transformer primary winding portions 9 to 14 are preferably uniformly distributed over the length of the secondary winding 8 and are interleaved to avoid the production of excessive stray flux. Thus, the secondary winding 8 is preferably made in the form of two cylindrical windings with the primary windings associated therewith as disk windings, thereby obtaining a relatively more favorable construction of the transformer than in the usual practice. Due to the fact that the several primary winding sections have current impressed thereon only momentarily a relatively high current density may prevail.

Control electrodes 41 to 46 inclusive and 51 to 56 inclusive are severally associated with anodes 20 to 26 inclusive and anodes 31 to 36 inclusive, respectively. The control electrodes are connected in pairs with a source of potential 61 through resistances 62 and 63 and through a distributor switch comprising a series of contacts 66 and a brush 67. The brush 67 is preferably rotatably driven by a synchronous motor 69 connected with the supply line 3. Thus control electrode 41 is connected with the control electrode 51 and all of the other electrodes are similarly connected in pairs. The potential source 61 herein shown as a battery, is connected at an intermediate point thereof with the cathode 37 of the valve thus permitting a positive or negative charge relative to the cathode potential to be impressed on the control electrodes dependent on the position of the brush on the series of contacts. The use of a single distributor permits control of opposing phases of the two anode groups simultaneously and in a similar manner. It may be desirable to delay picking up of the arc by the anodes of one group relative to the picking up of the arc by the anodes of the other group in the alternating current supply cycle. In such case the distributor is provided with a second series of contacts, each series then being connected with only one group of anodes.

In operation of the system when the brush 67 is initially in the position shown to cause the impression of a positive potential relative to the cathode potential in sequence on control electrodes 41, 42, 43, 44, 45, 46 and 41; a positive potential half wave is impressed on anodes 21, 22, 23, 24, 25, 26 and 21 in the order named through the transformer primary winding portions 9 to 14 from the transformer secondary winding 5. Such half waves flow through the primary winding portions from the point at which the phase sections of the secondary winding 5 are connected therewith to the terminal of the winding portions connected with the anodes. A potential half wave is thus impressed on the secondary winding 8 of the output transformer which potential is a combination of the potentials impressed on the several anodes 21, etc. as may be seen from the portion A of Fig. 2. It will be understood that brush 67 has now made one complete revolution and is again in the position shown. During such rotation of the brush positive potentials have also been impressed on the control electrodes 51, 52, 53, 54, 55, 56 and 51 in the order named, but the anodes associated with such control electrodes being at such time negative relative to the cathode potential, the associated anodes cannot pick up the arc.

Assuming that brush 67 is again in the position shown, having made one complete revolution, rotation of the brush will impress a positive potential on the control electrodes 51, 52, 53, 54, 55, 56 and 51 in the order named. A potential half wave is now impressed on the secondary transformer winding 5 and flows through the primary winding portions 9 to 14 from the point of connection of the several phase sections of the secondary transformer winding 5 therewith to the anodes 31, 32, 33, 34, 35, 36 and 31, in the order named. A potential half wave of different direction is thus impressed on the secondary winding 8 of the output transformer and is formed from the potentials impressed on the anodes 31, etc. as above described.

A single phase potential is thus impressed on the output transformer at a lower frequency than that of the supply line. Portion A of Fig. 2 shows the relations of the potentials impressed on the anodes from the supply line and the potential delivered to the distribution line taken relative to the potential of the cathode of the valve. It will be seen that the potentials impressed on the first series of anodes 21, etc., combine to form the positive half wave of the lower frequency potential indicated by the curve 8, and that the potentials impressed on the anodes 31, etc. combine the negative half wave of the lower frequency potential.

As may be seen from portion A of Fig. 2, if the amplitude of the potentials impressed on the several anodes were all equal, the combined potentials each forming a half wave would not approximate a sine wave in the distribution line. To obtain such approximation, the several phase sections of the transformer secondary winding 2 are connected with differently located points of the transformer primary winding sections 9 to 14 inclusive, intermediate the terminals thereof thus obtaining a variation in the potentials impressed on the several anodes as shown in portion B of Fig. 2, which illustrates the improved relations of the potentials in the supply and distribution line. Such different potentials produce a much closer approximation to sine curve, 140 thus giving the highly desirable sine wave shape in the distribution circuit.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In a frequency changing system comprising a transformer having a secondary winding and a plurality of primary windings each having an intermediate tap dividing the same into opposing sections, means for applying a current, the frequency of which is to be changed, to said taps, an electric valve having a plurality of anodes divided into two groups, the anodes of the respective groups thereof being severally connected with corresponding sections of said primary windings, a plurality of control electrodes severally associated with said anodes, a source of control current, and means operable to sequentially impress momentary potential of said source of control current simultaneously on the control electrodes associated with each said group thereof of such sign and magnitude as to thereby control the sequential initiation of flow of current through said primary winding sections by way of said anodes in dependence upon the sign and magnitude of the potential impressed thereon, the said intermediate taps being so positioned and the said potential being continually impressed on said control electrodes at such varied recurring moments as to cause said primary winding sections to induce in said secondary winding substantially sine wave alternating current of predetermined frequency.

2. In combination with an alternating current supply circuit, and an alternating current load circuit, of means for converting current received from said supply circuit into alternating current of a different frequency and the supply thereof to said load circuit comprising, an electric valve having a plurality of anodes divided into a plurality of groups and a plurality of control electrodes severally associated with said anodes, a transformer having a secondary winding connected with said load circuit and a plurality of primary windings each having an intermediate tap connected with said supply circuit and dividing such windings into opposing sections, the corresponding sections of said primary windings being severally connected with the anodes of one of said groups thereof and the opposing sections of said windings being severally connected with the anodes of another of said groups thereof, and means connected with and operable to sequentially impress momentarily potential simultaneously on the said control electrodes associated with each said group of anodes of such sign and magnitude as to thereby control the sequential initiation of flow of current through said winding sections by way of said anodes, the said intermediate taps being so positioned and the said potential being continually impressed on said control electrodes at such varied periods as to cause said primary winding sections to induce in said secondary winding substantially sine wave alternating current potential at a predetermined frequency relative to the voltage frequency of said supply circuit.

3. In combination with an alternating current supply circuit, and an alternating current load circuit, of means for converting current received from said supply circuit into alternating current of a different frequency and the supply thereof to said load circuit comprising, an electric valve having a plurality of anodes divided into a plurality of groups and a plurality of control electrodes severally associated with said anodes, a transformer having a secondary winding connected with said load circuit and a plurality of primary windings each having an intermediate tap connected with said supply circuit and dividing such windings into opposing sections, the corresponding sections of said primary windings being severally connected with the anodes of one of said groups thereof, and the opposing sections of such windings being severally connected with the anodes of another of said groups thereof, means including a source of control current connected with and continuously imparting to each of said control electrodes potential of such sign and magnitude as to prevent flow of current through said primary winding sections by way of said anodes, and means including said source of control current connected with and operable to sequentially impress momentarily potential simultaneously on the said control electrodes of each said group of anodes of such sign and magnitude as to thereby control the sequential initiation of flow of current through said winding sections by way of said anodes, the said intermediate taps of the respective said primary windings being at such varied positions and the last said potential being continually impressed on said control electrodes at such varied periods as to cause said primary windings to induce in said secondary winding substantially sine wave alternating current potential at a predetermined frequency relative to the voltage frequency of said supply circuit.

4. In combination with an alternating current supply circuit, and an alternating current load circuit, of means for converting current received from said supply circuit into alternating current of a different frequency and the supply thereof to said load circuit comprising, an electric valve having a cathode, a plurality of anodes divided into a plurality of groups, and a plurality of control electrodes severally associated with said anodes, an output transformer having a secondary winding connected with said load circuit and a plurality of primary windings each having an intermediate tap dividing such windings into opposing sections, the corresponding sections of said primary winding being severally connected with the anodes of one of said groups thereof and the opposing sections of such windings being severally connected with the anodes of another of said groups thereof, an input transformer having a primary winding connected with said supply circuit and a secondary winding divided into a plurality of star-connected phase-displaced sections severally connected with said intermediate taps of said primary windings and having the star connection thereof connected with said cathode, and means connected with and operable to sequentially impress momentarily potential simultaneously on the said control electrodes associated with the anodes of each said group of anodes of such sign and magnitude as to control the sequential initiation of flow of current through the anodes of the respective said groups thereof in dependence upon the sign and magnitude of the potential impressed thereon, the respective said intermediate taps being so positioned relative to each other and the said potential being continually impressed on said control electrodes at such varied periods as to cause the respective sections of said plurality of primary windings of said output transformer to induce in the said secondary winding thereof substantially sine wave alternating current potential of predetermined frequency relative to the voltage frequency of said supply circuit.

5. In combination with an alternating current supply circuit, and an alternating current load circuit, of means for converting current received from said supply circuit into alternating current of a different frequency and the supply thereof to said load circuit comprising, an electric valve having a cathode, a plurality of anodes divided into a plurality of groups, and a plurality of control electrodes severally associated with said anodes, an output transformer having a secondary winding connected with said load circuit and a plurality of primary windings each having an intermediate tap dividing such windings into opposing sections, the corresponding sections of said primary windings being severally connected with the anodes of one of said groups thereof and the opposing sections thereof being severally connected with the anodes of another of said groups thereof, an input transformer having a primary winding connected with said supply circuit and a secondary winding divided into a plurality of star-connected phase-displaced sections severally connected with said intermediate taps of said primary windings, means including a reactance connecting said star-point connection of said input transformer with said cathode, means including a source of control current connected with and continuously imparting to said control electrodes potential more negative than the potential of said cathode operable to prevent initiation of flow of current through said primary winding sections by way of the said anodes connected therewith, a distributor switch connected with said source of control current operable to sequentially impress momentarily potential thereof simultaneously on said control electrodes associated with each group of said anodes more positive than the potential of said cathode to thereby permit initiation of flow of current sequentially through said primary winding sections by way of said anodes and cathode, the said intermediate taps being so positioned relative to the respective said primary winding sections and said distributor switch being operated at such rate as to continually impress the last said potential on said control electrodes at such varied periods as to cause said primary winding sections of said output transformer to induce in the said secondary winding thereof substantially sine wave alternating current potential at a predetermined frequency relative to the voltage frequency of said supply circuit.

JULIUS JONAS.